Oct. 2, 1945.   H. E. MALONE   2,385,823
CONDITION CONTROLLER
Filed June 20, 1941
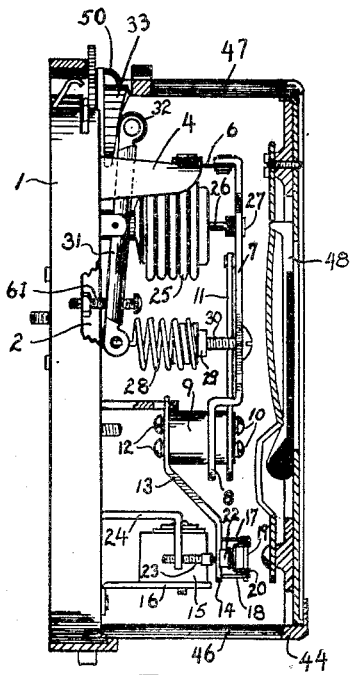
Fig. 1
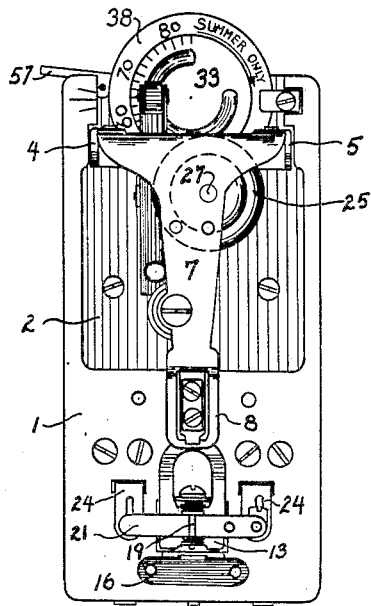
Fig. 2
Fig. 3
Fig. 4
Fig. 5
INVENTOR.
BY HOMER E. MALONE
ATTORNEY.

Patented Oct. 2, 1945

2,385,823

UNITED STATES PATENT OFFICE 2,385,823

CONDITION CONTROLLER

Homer E. Malone, Milwaukee, Wis., assignor to Perfex Corporation, Milwaukee, Wis., a corporation of Wisconsin Application June 20, 1941, Serial No. 398,977

17 Claims. (Cl. 200—140)

This invention relates in general to automatic controls, and more particularly to controls for air conditioning systems.

In the heating field it has become common to utilize unit heaters or forced air heating systems for heating buildings. This type of apparatus utilizing a fan is of some value in summer time for improving comfort conditions within the space served thereby. For this reason it has become common to provide a manual switch, which is accessible in the space, for operating the fan of the unit heater or heating system. This arrangement has the disadvantage of requiring both a thermostat and a manual switch within the heated space. It has been proposed to eliminate the manual switch by arranging the thermostat so that movement of the adjusting dial or lever to a predetermined position closes the thermostat contacts, regardless of the space temperature. This arrangement, however, is not entirely satisfactory. If the thermostat adjusting dial or lever is through accident or ignorance moved to this extreme position during the heating season, the heating apparatus will be maintained in continuous operation and thus overheat the space.

It is an object of the present invention to provide a thermostat which is adapted to control a unit heater or forced warm air heating system, and which provides for positive operation of the fan during the summer without any danger of accidental overheating in winter. This is accomplished by the arranging of the thermostat adjustment mechanism to maintain the thermostat contacts closed substantially irrespective of space temperature when the adjusting member is shifted to a predetermined position, and by the provision of a releasable stop mechanism which prevents accidental movement of this adjusting mechanism beyond a point providing desirable winter temperatures.

It is a further object of this invention to provide a thermostat or condition controller with an adjustment mechanism which is adapted, when moved to a predetermined position, to maintain the control device in a predetermined position substantially irrespective of the value of the condition, and to provide a releasable stop or retarding arrangement which prevents accidental movement of the control point adjustment mechanism to such predetermined position.

Another object of this invention is the provision of a condition controller of the type described with a one way stop or retarding mechanism which serves to stop or retard movement of the adjusting mechanism to a predetermined position, but which permits free movement of the adjusting mechanism in the opposite direction.

In certain types of installations it is desirable that the control point of the instrument be lowered to a value just slightly above freezing during periods of unoccupancy. This requires that the instrument be designed so as to have a very wide range of control point adjustment. This makes it difficult to make the actual control point of the instrument always conform to the indicated setting thereof throughout this wide range of adjustment. In addition, such wide adjusting range presents a danger that the actual control point of the instrument may fall below freezing, should the instrument lose its accurate calibration at its minimum control point. It is a further object of this invention to provide an instrument which is adjustable over a wide range, and in which the control point adjustment is determined by a factory setting, the manual control point adjustment when moved to the minimum temperature serving to place the minimum factory adjustment in complete control of the instrument.

While the present invention is particularly adapted for controlling heating systems which provide a cooling effect in summer, it is not limited thereto and the principles thereof are applicable to other types of condition controllers which function under analogous circumstances.

Other objects of the invention will appear from the following description and the appended claims.

For a full disclosure of the invention, reference is made to the following detailed description and to the accompanying drawing, in which Fig. 1 is a side view, partly in section, of a room thermostat incorporating the features of the present invention;

Fig. 2 is a front view of the thermostat with the cover removed;

Fig. 3 is an explosion view showing the assembly of the control point adjusting mechanism;

Fig. 4 is a fragmentary view showing the releasable one way stop mechanism; and

Fig. 5 is a diagrammatic view showing the application of the instrument to a unit heater.

Referring to Figs. 1 and 2, reference character 1 indicates a base for the thermostat. This base is preferably of molded plastic construction, having a rectangular recessed portion 2, this recessed portion extending to the upper edge thereof as shown. Located in this recessed portion is a U-shaped mounting bracket having a bottom portion 3 (Fig. 3) secured to the base, and leg portions 4 and 5 extending outwardly from the base. The outer ends of these leg portions are provided with in-turned lugs, each lug having secured thereto a spring hinge 6. The spring hinges 6 in turn are attached to an operating beam 7 which extends downwardly and parallel with base 1. This operating beam is provided at its lower end with an apertured offset portion 8 through which extends an insulating member 9. This insulating member is attached by screws 10 to a flexible arm 11 which extends parallel to the operating beam, being secured thereto at its upper end by rivets. The opposite end of the insulator 9 is attached by screws 12 to a contact bracket 13, this bracket being offset and providing an armature portion 14 which is adapted to cooperate with a permanent magnet 15 supported by brackets 16 on the base 1. The contact bracket 13 is also provided with a pair of spaced lugs 17 and 18 which support a pivot pin 19. This pin 19 carries a U-shaped bracket 20 which is secured to a twin contact arm 21, this arm carrying a contact such as 22 at each end. The movable contacts 22 cooperate with corresponding fixed contact studs 23, each of which is supported by a bracket 24 secured to the base. The contact brackets 24 are attached to suitable terminals, not shown. It will be apparent that when the movable contacts engage the fixed contact studs a circuit is completed from one stationary contact bracket 24 to the other, this circuit extending through the movable contacts and the contact bar 21. When the movable contacts are disengaged from the fixed contacts this circuit is broken. The armature 14 and permanent magnet 15 are provided for the purpose of imparting snap action to opening and closing movements of the contacts, this snap action being aided by the resiliency of the flexible arm 11.

The operating beam 7 is actuated by means of a condition responsive means or bellows 25, one end of which is secured by a pedestal to the base 1, the other end being attached to a pin 26, this pin being pointed at its end and abutting the bottom of a recessed member 27 attached to the operating beam. The operating beam 7 is biased toward the base and against the bellows 25 by means of a biasing spring 28, one end of this spring being attached to a connector 29 which receives a calibrating screw 30, this screw extending through a hole in the operating beam 7. The other end of the spring 28 is attached to a lever 31. This lever is pivoted between ears 32 (Fig. 3) which are formed integrally with the mounting bracket of the operating beam 7. The other end of the lever 31 carries a roller 32 which rides upon the surface of a helical cam member 33. This cam member 33 is preferably of molded plastic material and has a shaft 34 (Fig. 3) molded therein, this shaft having an annular slot 35 disposed adjacent its free end. The rear face of the cam member 33 is also provided with an annular rearwardly projecting portion 36 having a lug 37 formed thereon. The annular portion 36 carries a dial 38 having indicia formed thereon, this dial having a circular opening through which the annular portion 36 projects, and also having a slot 39 through which the lug 37 projects. Preferably a spring washer 40 is interposed between the cam member and dial. The shaft 34 extends through an opening 37 formed at the upper end of base 1. The cam member and dial assembly is held in place and urged rearwardly against the front face of the base by means of a spring clip 41 which is secured to the rear of the base, this spring clip having a slotted end portion 42 which fits into the slot 35 in shaft 34. This arrangement provides friction between the base and the cam assembly, thereby causing the cam assembly to remain in its adjusted position. The lug 37, fitting into slot 39, maintains the cam surface in proper relationship with the indicia on dial 38. This lug also cooperates with the bottom portion 3 of the U-shaped mounting bracket and limits the rotation of the cam beyond either its minimum or maximum position.

The operating mechanism described is provided with a cover 44 secured to the base, this cover having top and bottom openings 46 and 47 and carrying a thermometer 48 which is visible from the front thereof. It will be noted that the upper edge of the dial 38 extends beyond the top of the cover so that the indicia is visible. Also the dial and the cam may be rotated by manipulation of the protruding portion of the dial. The cover also carries a pointer 50 which cooperates with the indicia on the dial for indicating the adjustment of the instrument.

It will be apparent that when the temperature rises the pressure of the volatile fluid within the bellows 25 will increase, thus causing it to expand, rocking the operating beam 7 counterclockwise about spring hinge 6. This acts through the resilient strip 11 to urge the contact bracket 13 and the movable contacts away from the fixed contacts. When sufficient force is transmitted by the resilient strip 11 to move armature 14 against the attraction of the permanent magnet 15, the contacts separate with snap action. Conversely, on fall in temperature the bellows 25 contracts due to the action of spring 28 which causes movement of the movable contacts and armature toward the fixed contacts and permanent magnet. As the armature 14 approaches the magnet 15 the attractive force thereof increases to a point overcoming the resilient strip 11, at which time the movable contacts engage the fixed contacts with snap action.

By rotating the dial 38 the lever 31 is rocked about its pivot, thereby changing the tension of the spring 28. Thus when the dial 38 is rotated counterclockwise as seen in Fig. 1, the upper end of lever 31 is forced outwardly from the base, this causing the lower end of this lever to move toward the base and thus increase the tension on spring 28. This raises the control point of the instrument. Upon rotation of the dial 38 in the opposite direction, the tension of spring 28 is decreased, which lowers the control point of the instrument. By adjusting the calibration screw 30 with a screw driver, the actual control point of the instrument is made to correspond to that indicated by the indicia on adjusting dial 38.

For a more detailed disclosure of the thermostatic mechanism above described, reference is made to the application of H. E. Lindemann, Serial No. 230,723, filed September 19, 1938.

As shown in Fig. 5, the thermostat above described may be connected in circuit with the motor 51 of a unit heater 52, the thermostat serving to start and stop the fan so as to maintain the room temperature constant. In summer it is desirable to operate the fan in order to circulate air for improving comfort conditions. In order to provide for operation of the fan in summer, but without requiring an additional switch, the adjusting cam of the thermostat is designed so that when the dial is moved to its extreme counterclockwise position the control point of the instrument will be higher than those normally occurring during the summer. Thus when the dial is rotated to this position the thermostat contacts are maintained in closed position substantially irrespective of temperature. This arrangement by itself would not be satisfactory, for if the dial were adjusted to this maximum position in winter, the thermostat contacts would remain closed regardless of the room temperature and consequently the room would be overheated.

In order to prevent such accidental manipulation of the adjusting mechanism a releasable stop or retarding mechanism is provided. While this mechanism may take various forms depending upon the construction of the instrument to which it is applied, it is shown as comprising a pivoted lever 55 which is pivoted to a pin 56 mounted on the base. The outer end of lever 56 is formed as a handle portion 57 and extends beyond the edge of the base and through the cover. The lever 55 as shown is received in a slotted portion of the base and its inner end extends to a point wherein it is engaged by the lug 37 when the adjusting dial is rotated to a point wherein the numeral "80" coincides with the pointer 50 on the cover. The lever 55 is urged to the position shown in Fig. 4 by means of a pin 58 which slides in a slot 59 formed in the base, this pin being urged upwardly by means of a spring 60. Thus the inner end of the lever 55 is urged against the outer surface of the annular portion 36 of the cam member. This arrangement therefore prevents rotation of the adjusting dial beyond a point which sets the thermostat control point at 80°. It will be noted that the dial between its 80° marking and its "On" marking is marked "Summer only," which indicates to the user that the dial should not be rotated beyond the stop except for summer operation.

When it is desired to operate the fan during the summer it is necessary for the user to depress the handle portion 57 at the same time that the dial is turned to the summer "On" position. This depressing of the handle 57 swings the inner end of lever 55 clear of the path of lug 37 and thus permits rotation of the dial to summer position. It will be noted that this requires that the user employ both hands in order to set the adjustment to the "On" position. Consequently the dial cannot be rotated to this position accidentally. It should be noted that when the dial 38 is rotated clockwise from the "On" position, the lug 37 merely engages the inclined lower surface of lever 55 and thus urges this lever clear of its path. Consequently the adjusting mechanism may be shifted from its summer "On" position to its normal winter position or summer "Off" position without manipulation of the handle 57.

In some cases it is desirable that the thermostat be adjustable to an extreme low control point in order to maintain the space only slightly above freezing when unoccupied. It is important, in order to prevent damage, that the control point of the thermostat must not fall below the freezing point. Thus it is necessary that the thermostat calibration be accurate both at the extreme low control point as well as in its normal adjusting range. In order to meet this requirement without increasing the cost of the instrument, this invention contemplates the provision of a minimum stop 61 for the adjusting mechanism. This stop consists of a screw extending through the adjusting lever 31 and being threaded into the base. This adjusting screw is provided with a lock nut as shown. It will be apparent that as the adjusting dial 38 is rotated toward its 40° setting the lever 31 rotates counterclockwise about its pivot, thus reducing the tension of spring 28 and lowering the control point of the instrument. The screw 61 is adjusted at the factory so that it stops counterclockwise rotation of lever 31 when the tension of the spring 28 is reduced to a point causing the instrument to operate at 40°. It is then locked in this position by means of the lock nut. The cam surface 33 is designed so that it rides clear of the roller 32 before the dial reaches its 40° setting. Thus as the dial is rotated to its 40° setting it becomes ent'rely disengaged from the remainder of the thermostat adjusting mechanism and permits the stop screw alone to determine the control point. Inasmuch as the cam 33 when rotated to its normal winter position urges the lever 31 clear of the stop screw 61, the adjustment of the stop screw 61 in no way affects the calibration or adjustment of the instrument except for the minimum control point.

From the foregoing description it will be apparent that the present invention provides a thermostat which is adapted to control heating apparatus in the winter and to act as a manual switch for a fan in summer. It will also be seen that this arrangement includes a stop or retarding mechanism which prevents actuation of the thermostat adjusting mechanism beyond a predetermined point by accident, this stop or retarding means being releasable so as to permit intentional movement of the adjusting mechanism to the "on" position. It will also be apparent that the present invention provides a thermostat having the necessary wide control point adjusting range for the purpose specified and which is insured of an accurate minimum control point adjustment as well as accurate control point adjustment within the normal operating range of the instrument. While the invention is especially adapted for control of warm air furnaces or fans in response to temperature, it is not limited thereto and is applicable to controlling other types of apparatus in response to other conditions. While a preferred form of the invention has been disclosed, it will be appreciated that the invention may take many other forms depending upon the type of control apparatus to which it is applied. As many changes may be made without departing from the scope of the invention, it is desired to be limited only by the appended claims.

What is claimed is:

1. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the thermostatic element, said control point adjusting means being capable of varying the control point from values suitable for the heating season to a value higher than the temperatures normally occurring at other times for causing the control device to assume its first position substantially irrespective of temperature, stop means associated with said adjusting means for preventing accidental adjustment of the control point above a value which is suitable for the heating season, and release means for said stop means for permitting adjustment of the control point to a higher value.

2. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the thermostatic element, said control point adjusting means being capable of varying the control point from values suitable for the heating season to a value higher than the temperatures normally occurring at other times for causing the control device to assume its first position substantially irrespective of temperature, stop means associated with said adjusting means for preventing accidental adjustment of the control point above a value which is suitable for the heating season, a manual release member for said stop means adapted when moved from a normal position to a release position to release said stop means, and means for causing said release member to assume its normal position whenever it is not manually held in its release position.

3. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the thermostatic element, said control point adjusting means being capable of varying the control point from values suitable for the heating season to a value higher than the temperatures normally occurring at other times for causing the control device to assume its first position substantially irrespective of temperature, and one way retarding means arranged to prevent accidental movement of the control point adjusting means beyond a setting which is suitable for the heating season, said last mentioned means being constructed and arranged to permit unretarded movement of the control point adjusting means in the opposite direction.

4. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the thermostatic element, said control point adjusting means including an operating member movable through a portion of its range of movement to adjust the control point within a range of values suitable for the heating season and also movable to a predetermined position which causes the control device to assume its first position substantially irrespective of temperature, stop means for preventing accidental movement of the operating member to said predetermined position, and release means for said stop means for permitting movement of said operating member to said predetermined position.

5. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the thermostatic element, said control point adjusting means including an operating member movable through a portion of its range of movement to adjust the control point within a range of values suitable for the heating season and also movable to a predetermined position which causes the control device to assume its first position substantially irrespective of temperature, stop means for preventing accidental movement of the operating member to said predetermined position, a manual release member for said stop means adapted when moved from a normal position to a release position to release said stop means, and means for causing said release member to assume its normal position whenever it is not manually held in its release position.

6. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the responsive means, said control point adjusting means including an operating member movable through a portion of its range of movement to adjust the control point within a range of values suitable for winter operation and also movable to a predetermined position which causes the control device to assume its first position substantially irrespective of temperature, stop means for preventing accidental movement of the operating member to said predetermined position, a manual release member for said stop means adapted when moved from a normal position to a release position to release said stop means, and means for causing said release member to assume its normal position whenever it is not manually held in its release position, said stop means being of one way construction for permitting movement of the operating member from said predetermined position into said portion of its range of movement without actuating said release member.

7. In a controller for an air conditioner which is adapted to heat a space during the heating season and to improve conditions therein at other times, the combination of, a control device having a first position adapted to place the conditioner into operation and a second position adapted to place the conditioner out of operation, a thermostatic element for moving said control device to its first position upon fall in temperature to a predetermined value and for moving said control device to its second position upon rise in temperature above said value, control point adjusting means for determining the temperature at which the control device is actuated by the responsive means, said control point adjusting means including an operating member movable through a portion of its range of movement to adjust the control point within a range of values suitable for winter operation and also movable to a predetermined position which causes the control device to assume its first position substantially irrespective of temperature, and retarding means associated with said operating member for preventing accidental movement of the operating member to said predetermined position.

8. In a control instrument of the class described, the combination of, a control device movable from a first position to a second position, a condition responsive device for causing movement of the control device in accordance with the condition to which the responsive device responds, adjusting means for adjusting the instrument and including an operating member, said operating member being arranged so that movement thereof through a predetermined portion of its range adjusts the instrument and movement of the operating member to a predetermined position causes said control device to assume one of its positions substantially irrespective of the value of said condition, stop means for preventing accidental movement of the operating member to said predetermined position, and release means for said stop means for permitting movement of said operating member to said predetermined position.

9. In a control instrument of the class described, the combination of, a control device movable from a first position to a second position, a condition responsive device for causing movement of the control device in accordance with the condition to which the condition responsive device responds, adjusting means for adjusting the instrument and including an operating member, said operating member being arranged so that movement thereof through a predetermined portion of its range adjusts the instrument and movement of the operating member to a predetermined position causes said control device to assume one of its positions substantially irrespective of the value of said condition, stop means for preventing accidental movement of the operating member to said predetermined position, a manual release member for said stop means adapted when moved from a normal position to a release position to release said stop means, and means for causing said release member to assume its normal position whenever it is not manually held in its release position.

10. In a control instrument of the class described, the combination of, a control device movable from a first position to a second position, a condition responsive device for causing movement of the control device in accordance with the condition to which the condition responsive device responds, adjusting means for adjusting the instrument and including an operating member, said operating member being arranged so that movement thereof through a predetermined portion of its range adjusts the instrument and movement of the operating member to a predetermined position causes said control device to assume one of its positions substantially irrespective of the value of said condition, stop means for preventing accidental movement of the operating member to said predetermined position, a manual release member for said stop means adapted when moved from a normal position to a release position to release said stop means, and means for causing said release member to assume its normal position whenever it is not manually held in its release position, said stop means being of one way construction for permitting movement of the operating member from said predetermined position into said portion of its range of movement without actuating said release member.

11. In a control instrument of the class described, the combination of, a control device movable from a first position to a second position, a condition responsive device for causing movement of the control device in accordance with the condition to which the condition responsive device responds, adjusting means for adjusting the instrument and including an operating member, said operating member being arranged so that movement thereof through a predetermined portion of its range adjusts the instrument and movement of the operating member to a predetermined position causes said control device to assume one of its positions substantially irrespective of the value of said condition, and retarding means associated with said operating member for preventing accidental movement of the operating member to said predetermined position.

12. In a control instrument of the class described, the combination of, a control device movable from a first position to a second position, a condition responsive device for causing movement of the control device in accordance with the condition to which the condition responsive device responds, adjusting means for adjusting the instrument and including an operating member, said operating member being arranged so that movement thereof through a predetermined portion of its range adjusts the instrument and movement of the operating member to a predetermined position causes said control device to assume one of its positions substantially irrespective of the value of said condition, and one way retarding means arranged to prevent accidental movement of the operating member from said portion of its range of movement to said predetermined position, said retarding means being constructed and arranged to permit unretarded movement of the operating member from said predetermined position to said portion of its range of movement.

13. In a control instrument of the class described, the combination of, a cover, a control device located in said cover and movable from a first position to a second position, a condition responsive element for causing movement of the control device between its positions, a manual adjusting member having a portion extending to the exterior of the cover and arranged upon movement through a portion of its range of movement to adjust the instrument and upon movement to a predetermined position to cause the control device to assume one of its positions substantially irrespective of said condition, and releasable stop means located inside the cover for preventing movement of the adjusting means to said predetermined position, said stop means including a release member extending through the cover.

14. In a control instrument of the class described, the combination of, a cover, a control device located in said cover and movable from a first position to a second position, a condition responsive element for causing movement of the control device between its positions, manual adjusting means for the instrument comprising a wheel journaled inside of the cover and having a portion extending through the cover, said wheel being arranged upon rotation through a portion of its range of movement to adjust the instrument and upon rotation to a predetermined position to cause said control device to assume one of its positions substantially irrespective of said condition, an abutment movable with the wheel about the axis thereof, and stop means including an element adapted for engagement by said abutment for normally preventing rotation of the wheel to said predetermined position, said stop means also including a manual release member extending through the cover and adapted upon movement thereof to permit rotation of the wheel to said predetermined position.

15. In a control instrument of the class described, the combination of, a cover, a control device located in said cover and movable from a first position to a second position, a condition responsive element for causing movement of the control device between its positions, manual adjusting means for the instrument comprising a wheel journaled inside of the cover and having a portion extending through the cover, said wheel being arranged upon rotation through a portion of its range of movement to adjust the instrument and upon rotation to a predetermined position to cause said control device to assume one of its positions substantially irrespective of said condition, an abutment movable with the wheel about the axis thereof, and stop means including a lever pivoted intermediate its ends within the cover, one end of the lever being adapted to engage said abutment to prevent rotation of the wheel to said predetermined position and the other end extending through the cover, rocking of the lever about its pivot moving said one end of the lever out of the path of said abutment to permit rotation of the wheel to said predetermined position.

16. In a control instrument of the class described, the combination of, a control device movable from a first position to a second position, condition responsive means for causing movement of said control device between its positions, adjusting means for adjusting the control point of the instrument and including an operating member, said operating member being arranged so that movement from one end of its range of movement to an intermediate position varies the control point of the instrument and so that continued movement in the same direction to a predetermined position causes the control device to assume one of its positions substantially irrespective of said condition, limiting means associated with the condition responsive means for determining the control point of the instrument when the adjusting means is at said one end of its range of movement, said limiting means assuming full control of the adjustment of the instrument when the adjusting means is at said one end of its range of movement and being adjustable independently of said adjusting means to insure the control point of the instrument conforms to the setting of the adjusting means at said one end of its range of movement, said limiting means also being placed completely out of control when the adjusting means is moved toward the other end of its range of movement whereby adjustment of said limiting means has no effect on the instrument when the adjusting means is positioned away from said one end of its range of movement, stop means for preventing accidental movement of the adjusting means to said predetermined position, and release means for said stop means to permit movement of the adjusting means to said predetermined position.

17. In a control instrument of the class described, the combination of, a control device movable from a first position to a second position, condition responsive means for causing movement of said control device between its positions, adjusting means for adjusting the control point of the instrument and including an operating member, limiting means associated with the condition responsive means for determining the control point of the instrument when the adjusting means is at one end of its range of movement, said limiting means assuming full control of the adjustment of the instrument when the adjusting means is at said one end of its range of movement and being adjustable independently of said adjusting means to insure the control point of the instrument conforms to the setting of the adjusting means at said one end of its range of movement, said limiting means also being placed completely out of control when the adjusting means is moved toward the other end of its range of movement whereby adjustment of said limiting means has no effect on the instrument when the adjusting means is positioned away from from said one end of its range of movement.

HOMER E. MALONE.